Oct. 8, 1968  K. B. ZOPF ET AL  3,404,705
COUPLING AND VALVE MECHANISM
Filed Sept. 10, 1965  2 Sheets-Sheet 1

INVENTORS
HOWARD J. HANSEN
KENT B. ZOPF
JAMES F. NORTON
BY *Hoffmann and Yount*
ATTORNEYS

INVENTORS
HOWARD J. HANSEN
KENT B. ZOPF
JAMES F. NORTON

BY Hoffmann and Yount

ATTORNEYS

United States Patent Office 3,404,705
Patented Oct. 8, 1968

3,404,705
COUPLING AND VALVE MECHANISM
Kent B. Zopf, Bay Village, James Frederick Norton, Cleveland, and Howard J. Hansen, Bay Village, Ohio, assignors to The Hansen Manufacturing Company, Cleveland, Ohio, a corporation of Ohio
Filed Sept. 10, 1965, Ser. No. 486,352
14 Claims. (Cl. 137—625.25)

ABSTRACT OF THE DISCLOSURE

Disclosed herein is a coupling and valve mechanism including a body having inlet and outlet chambers. A valve sleeve is slidably mounted on the body for controlling the flow of fluid between the chambers. A coupling means is provided for coupling a conduit to the body. The coupling means includes a lock sleeve for actuating detents engaging the conduit. An assembly is provided for blocking movement of the lock sleeve from a release position until the conduit is inserted into the coupling. A venting chamber is provided for receiving fluid which urges the valve sleeve to a closed position and the lock sleeve to a locking position.

---

The present invention relates to a coupling and valve mechanism and, more particularly, to a coupling and valve mechanism for coupling an outlet conduit to a high pressure supply.

Problems are encountered in high pressure fluid systems where a valve connected with a high pressure supply can be opened without an outlet conduit coupled thereto and where an outlet conduit can be uncoupled from a supply with high pressure fluid in the outlet conduit which will be released to the atmosphere upon the uncoupling thereof from the supply.

Accordingly, an important object of the present invention is to provide a new and improved coupling and valve mechanism for connecting an outlet conduit to a high pressure supply in which the movement of a locking member to disconnect the outlet conduit will automatically cause pressure to be applied to the locking member to force the locking member to its locking position and block disconnection of the outlet conduit if a high pressure is present in the outlet conduit and will release the high pressure in the conduit to the atmosphere.

Another object of the present invention is to provide a new and improved coupling and valve mechanism for coupling an outlet conduit to a high pressure supply in which the valve cannot be opened to supply pressure fluid to the outlet conduit unless the outlet conduit is connected with the valve and which is so constructed and arranged that the outlet conduit is vented when the valve is closed with any substantial pressure in the outlet conduit being released to the atmosphere before disconnection thereof.

A further object of the present invention is to provide a new and improved quick connect-disconnect coupling and valve mechanism for connecting an outlet hose or conduit to a high pressure supply in which the valve element of the valve can be moved to a closed position to block the flow of pressure fluid from the supply to the coupling and in which a locking member movable from a locking position to a release position to permit the uncoupling of the outlet conduit is urged to its locking position by any fluid pressure fluid in the outlet side of the valve which is directed from the outlet side of the valve against the locking member as the locking member is operated toward its release position without first closing the valve to block the flow of pressure fluid from the supply.

A still further object of the present invention is to provide a new and improved coupling and valve mechanism for connecting an outlet hose or conduit to a supply wherein the valve is disposed between the coupling and the supply and the outlet side thereof is vented when it is closed and in which movement of a locking member for preventing uncoupling of the outlet conduit toward its position for releasing the outlet conduit vents the outlet side of the valve and directs pressure fluid from the valve against the locking member to urge it to its locking position and against the valve member to move it to its closed position if a substantial pressure is vented from the outlet side of the valve.

Still another object of the present invention is the provision of a new and improved coupling and valve mechanism for connecting an outlet hose and conduit to a supply in which the coupling of the outlet conduit to the supply can be readily effected by moving a cooperating coupling element on the outlet conduit axially into engagement with a coupling element on the supply, the coupling being so constructed and arranged that the coupling operation may be effected quickly and easily with no independent or other operations being required to effect a turning on of the valve, the coupling being such that the connection can only take place with the valve closed.

A still further object of the present invention is the provision of a new and improved coupling and valve mechanism for connecting an outlet conduit to a supply which has a valve which can be opened and closed to block the coupling from the supply, and which is so constructed and arranged that the valve cannot be opened unless an outlet conduit has been coupled thereto and so that the coupling cannot be disconnected unless the valve has been closed and the high pressure on the coupling removed, the coupling being further constructed and arranged that the valve can be closed or opened at any time without uncoupling the outlet conduit.

A further object of the present invention is to provide a new and improved valve and coupling mechanism having a locking member with locking and release positions for coupling an outlet conduit to a high pressure supply through a valve having a valve sleeve movable to open and close the valve and to vent the outlet of the valve when the latter is closed with the locking and valve members being arranged to form a venting chamber into which the pressure is vented so as to act on the members to urge them to their locking and valve closed positions, respectively.

Another object of the present invention is to provide a valve and coupling mechanism as in any of the preceding objects in which a valve port, which is uncovered by a valve sleeve to vent the outlet side of the valve, is not directly exposed so that it is open to dirt, etc., and so that high pressure fluid will not blast directly radially outwardly of the coupling on the venting of the coupling and valve mechanism.

A still further object of the present invention is to provide a valve mechanism in which a valve member movable from an open position to a closed position to progressively block a pressure fluid supply from the coupling and to progressively open a port communicating with the outlet side to vent the latter will be moved to its valve closed position by pressure fluid being vented if the valve member is operated to a position partially uncovering the venting port.

Further objects and advantages of the present invention will be apparent to those skilled in the art to which it relates from the following detailed description of a preferred embodiment thereof made with reference to the accompanying drawings forming a part of this specification and in which.

Figure 1:
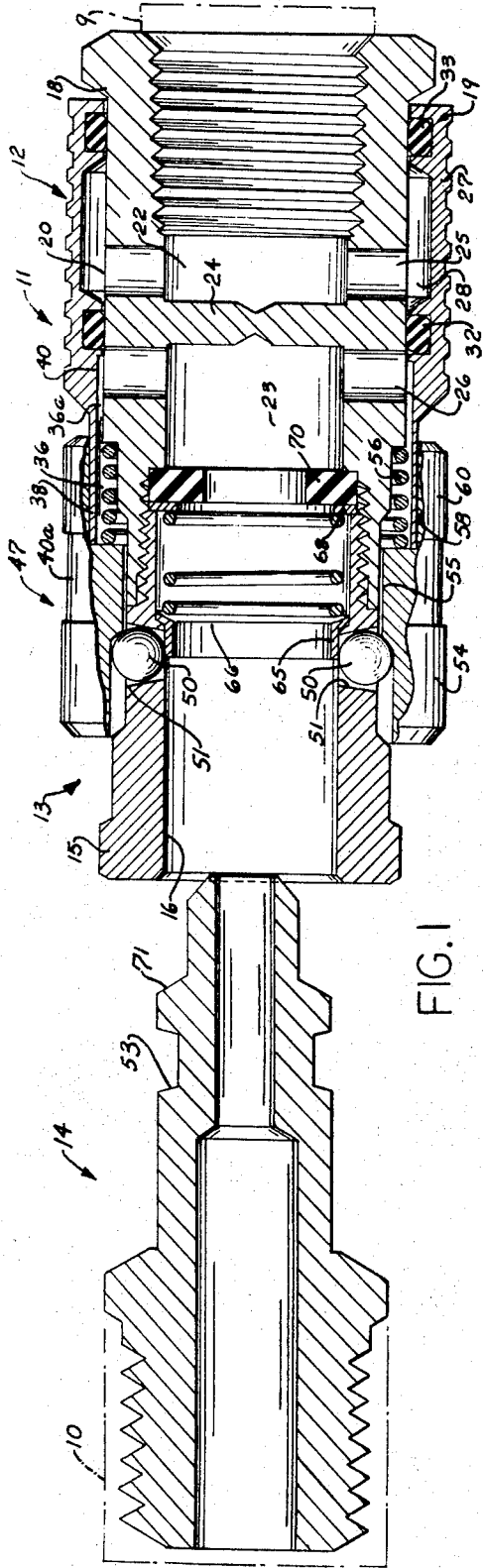
FIG. 1 is a sectional view of a valve and coupling mechanism embodying the present invention with parts disconnected.

The present invention is illustrated in the drawings as embodied in a combined valve and fluid coupling mechanism for use in high pressure fluid lines, and specifically for connecting a high pressure fluid supply conduit 9 to a high pressure fluid outlet conduit 10. The valve and coupling mechanism comprises a valve and socket part 11 including a slide valve 12 and a socket element 13 of a quick connect-disconnect coupling. The socket and valve part are adapted to be connected to the supply conduit 9 and to receive a plug coupling element 14 adapted to be received in the socket element 13 to connect the conduit 10 to the supply through the slide valve, and be released therefrom to disconnect the conduits 9 and 10, as will be apparent from the description below.

The socket element 13 of the socket and valve part 11 includes a socket body portion 15 associated with the slide valve 12 and having a socket 16 at its forward or outlet end to receive the plug element 14. The slide valve 12 includes a valve body 18 connected with the socket body portion 15 and a valve sleeve 19 which is positioned encircling the valve body 18 and is slidable along the outer peripheral surface 20 of the valve body 18 to control fluid flow between an inlet chamber 22 and an outlet chamber 23 formed in the valve body 18 adjacent its rearward and forward ends respectively. The surface 20 of the valve body 18 along which the valve sleeve 19 slides is preferably highly polished and free of nicks and depressions.

The inlet chamber 22 of the slide valve 12 is separated from the outlet chamber 23 by a partition member 24 located generally centrally of the valve body 18. A plurality of radial ports 25, which are disposed in a common radial plane, extend from the inlet chamber 22 radially through the valve body 18 and open into the outer peripheral surface 20 of the body 18. A similar set of ports 26 open into the surface 20 and communicate with the outlet chamber 23.

The valve sleeve member 19 for controlling the intercommunication of the inlet and outlet chambers includes a sleeve body 27 which is slidable on the outer peripheral surface 20 of the valve body 18 between a forward valve open position and a rearward valve closed position. In the valve open position, the ports 25, 26 are interconnected by a fluid conducting annular recess 28 on the internal surface of the sleeve body, i.e., the surface adjacent the outer peripheral surface 20 of the body 18. The recess 28 is of a sufficient width to connect the passageways 25 with the passageways 26 and provide a passage for the flow of fluid from the inlet chamber 22 into the outlet chamber 23 when the sleeve is positioned in its open position relative to the body 18. The sleeve body 27 has sealing rings 32, 33 which are disposed in annular receiving grooves immediately outwardly of the opposed ends of the recess 28 and provide seals between the valve sleeve and body member 18 to prevent leakage from the recess 28 along the valve body.

The valve sleeve 19 is movable to a closed position in which the sealing ring 32 is positioned between the ports 25, 26 to block the flow of pressure fluid between the inlet and outlet chambers 22, 23. In this position, the sealing ring 32 seals against a portion of the valve body between the ports 25, 26 and the ports 25, 26 are no longer in communication with each other. Moreover, when the valve sleeve 19 is moved to its closed position, the sealing ring 32 is progressively moved across the ports 26 to progressively block communication between the inlet and outlet chambers and to progressively open the ports 26 to a venting chamber 36.

In the illustrated embodiment, the venting chamber 36 is formed, in part, by an annular flange portion 38 extending axially forward from the forward end of the valve sleeve body 27. The flange 38 and forward portion of the valve sleeve are counter-bored to provide a space or passage 36a between the valve sleeve and valve body 20 when the valve sleeve is in its closed position, as illustrated in FIG. 1. The space 36a communicates with the chamber 36 and the ports 26 when the sleeve 19 is in its closed position. The bottom of the counterbore provides an internal shoulder 40 on the valve sleeve 19 which is a pressure surface against which pressure in the venting passage 36a acts. The pressure also acts on the outer tip 40a of the sleeve. The venting chamber 36 although closed by walls on all sides is not a fluid tight chamber and pressure fluid therein escapes therefrom to atmosphere to effect a venting of the outlet side of the valve.

The socket and valve part 11 includes coupling means 47 for holding the plug element 14 in the socket element 13. The coupling mechanism 47 operates to enable the plug element 14 to be quickly and readily secured in the bore 16 of the socket element and can be quickly released to enable plug element 14 to be disconnected from the socket element 13 provided the valve sleeve 19 has been moved to its valve closed position.

The coupling mechanism 47 comprises a plurality of detent balls 50 disposed in individual openings 51 in the socket body member 16. The ball detents 50 are adapted to project inwardly of the side wall of the bore 16 in the socket body member 15 and to be received in an annular groove 53 in the plug element 14 to securely hold the plug element in the bore 16. The detent balls 50 are adapted to be held against movement out of the groove 53 by a locking sleeve 54 which is slidable on the valve and socket bodies and has a locking position in which a locking portion 55 thereof is disposed about and engages the outer radial periphery of the balls 50 to prevent the balls from moving radially outwardly in their receiving openings to release the plug element 14 for separation from the socket body. The locking sleeve 54 is biased to its locking position by a spring 56 disposed about the forward end portion of the valve body 18, which is of reduced diameter, and acts on the locking sleeve 54 to urge the latter forward to its locking position. The locking sleeve 54 has a counterbore portion 58 at its rearward end, i.e., the end facing the valve sleeve 19, which provides an axially extending flange 60 which encircles and receives the spring 56 and the annular flange 38 extending from the valve sleeve body. The flange 38 extends into the counterbore 58 and is disposed between the spring 56 and the wall of the counterbore. The spring 56 abuts the bottom of the counterbore and a shoulder formed on the valve body 18 at its forward end.

Figure 2:
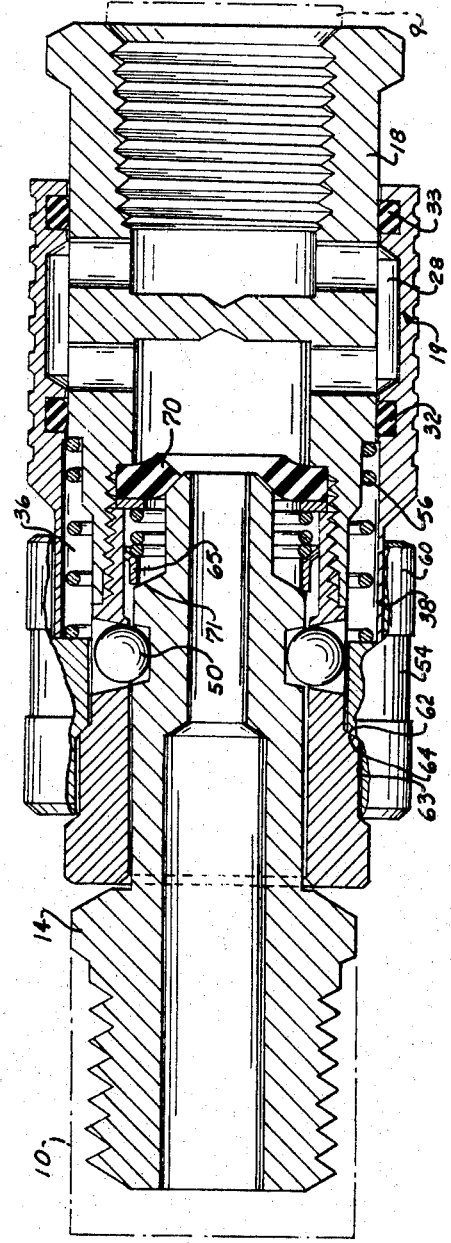
FIG. 2 is a sectional view of the valve and coupling mechanism of FIG. 1, with the parts shown in their connected position.

When the locking sleeve 54 is in its locking position, shown in FIG. 2, it has an internal shoulder 62 formed by counterbore 63 in the forward end of the sleeve which abuts an external shoulder 64 on the socket body member 15 immediately forwardly of the openings 51 and the detent balls 50. This limits the forward movement of the locking sleeve 54 to its locking position where the locking portion 55 is disposed in contact with the balls 50.

When the coupling is to be disconnected, the locking sleeve 54 is moved rearwardly to its release position, shown in FIG. 1, against the bias of the spring 56 to position the counterbore 63 radially adjacent the detent balls 50 to allow the detent balls to move radially outwardly of the socket body member 15 to clear the annular groove 53 in the plug element 14 and allow the latter to move outwardly of the bore 16. As the plug element is moved outwardly of the bore 16, a ring-like member 65 disposed in the bore 16 is moved by a spring 66 into a position to hold the balls 50 in their positions wherein they extend into the counterbore 63. The ringlike member 65 has a flange 65a thereon which engages a shoulder on the body 15 to limit the movement of the member 65 by the spring 66. As long as the balls are in the position shown in FIG. 1, the locking sleeve 54 cannot be moved forwardly. The annular ring-like member 65 is disposed adjacent the rearward end of the bore 16 and the spring 66 urges the member 65 to its position for holding the balls outwardly. The spring 66 is disposed between the ring-like member 65 and a washer 68 at the rearward end of the fluid body member 16. The washer 68 clamps a gasket 70 in position to provide a seal between the socket body member 15 and the valve body member 18. The nose end of the plug element 14 when the plug element 14 is connected to the socket element 13 seats against the gasket 70 and a seal is thereby provided therebetween, as shown in FIG. 2.

When an outlet conduit 10 is to be coupled to the supply, the plug element 14 connected with the conduit 10 is inserted into the bore 16, the end of the plug element 14 is received inside of the annular ring member 65, and an external shoulder 71 on the plug element 14 engages the member 65 and moves the member 65 against the bias of the spring 66 to allow the detent balls 50 to move into the annular groove 53 when the groove 53 is positioned opposite the balls. In this position, the nose of the plug element seals against the sealing gasket 70.

When the locking sleeve 54 is in its unlocking position and the valve sleeve 19 is in its valve closed position, the forwardly axially extending flange 38 on the sleeve terminates immediately adjacent the bottom of the counterbore 58 in the locking sleeve 54, as shown in FIG. 1. Therefore, the valve sleeve 19 cannot be moved toward its open position unless the locking sleeve 54 is moved forwardly to its locking position. If the plug 14 is not disposed in the bore 16, the detent balls 50 are held in the position shown in FIG. 1 and thereby prevent forward movement of the locking sleeve 54 and valve sleeve 19. Consequently, the valve sleeve 19 cannot be moved to open the valve unless a plug element 14 is coupled with the valve part 11.

When the detent balls 50 drop into the groove 53 to release the locking sleeve 54, the spring 56 moves the locking sleeve to its locking position. The movement of the locking sleeve 54 then allows the valve sleeve 19 to be moved to its valve open position. If the plug 14 is coupled to the socket element 13 by gripping the rearward end of the plug 14 and the valve sleeve 19, and the plug 14 is then moved into the bore 16 to release the locking sleeve 54, the operator can by merely moving his hands toward each other, i.e., axially of the valve and coupling mechanism, insert the plug element 14 and move the valve sleeve 19 to its valve open position as the locking sleeve 54 moves to its locking position. Consequently, a single operation, namely, the axial insertion of the plug element 14 into the socket element 13 while gripping the valve sleeve 19 can effect the connection of the plug and socket member and the opening of the valve.

When the device is coupled as shown in FIG. 2, the plug element 14 cannot be uncoupled as a practical matter without first moving the valve sleeve 19 to its valve closed position. If an attempt is made to move the locking sleeve 54 to release the plug element 14, movement of the sleeve 54 is transmitted to the valve sleeve 19 by reason of the abutting engagement of the flange on the valve sleeve with the bottom of the bore 58 to cause the valve sleeve to move toward its valve closed position. When this occurs, the counterbore in the valve sleeve providing the passage 36a is moved into communication with the ports 26 of the outlet chamber 23 as the sealing ring 32 moves toward its valve closed position. Thus, fluid under pressure is directed through the passage 36a and into chamber 36. The fluid in the chamber 36 acts against the bottom of the counterbore 58 to apply a fluid pressure force which urges the locking sleeve 54 to its locking position. Moreover, the fluid pressure also acts on the bottom surface 40 of the counterbore in the valve sleeve 19 to urge the valve sleeve 19 to its valve closed position. Consequently, the uncoupling cannot take place with the valve sleeve 19 in a valve open position. Moreover, the structure assures that the valve sleeve 19 is entirely closed whenever the coupling is disconnected.

In addition to the foregoing, the structure is such that even when the valve sleeve is first moved to a valve closed position before the disconnection takes place, the outlet chamber 23 is vented to the atmosphere. The vented air, however, cannot issue as a blast of air from the ports 26 to carry dirt and other particles against the operator. The air being vented from the outlet chamber must first pass around the flange 38 which is disposed in the locking sleeve 54 and the counterbore 58 provides a venting chamber into which the air flows before it is directed outside of the mechanism.

Figure 3:
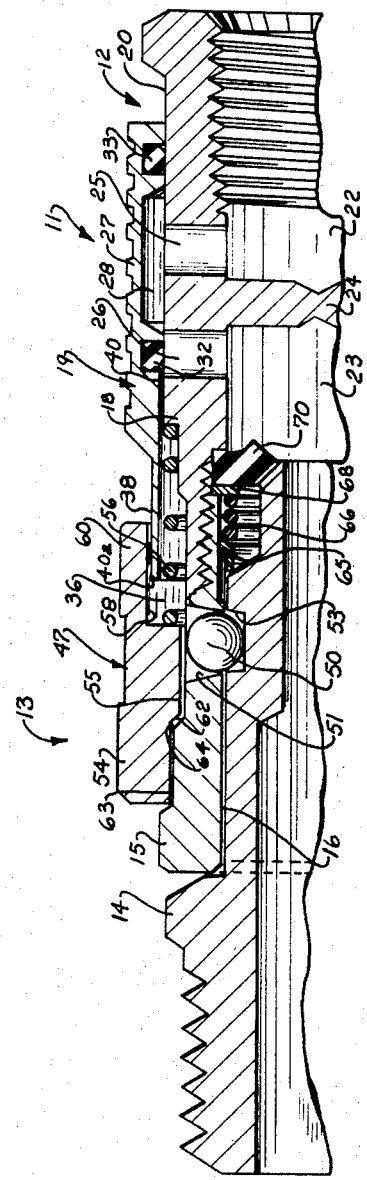
FIG. 3 is a fragmentary sectional view of the valve and coupling mechanism of FIG. 1 showing parts thereof in a different operative position.

While other couplings have been so constructed and arranged so that movement of a locking sleeve rearwardly to release the coupling will, by reason of an abutting engagement, cause a valve sleeve to move rearwardly, these couplings have generally been such that a blast of air could issue from the coupling if the valve sleeve is left in an intermediate position so that the vent means is venting the outlet chamber while the latter is in communication with the inlet chamber. In the described structure, when the valve sleeve 19 is in an intermediate position, as shown in FIG. 3, wherein the outlet chamber is being vented while in communication with the inlet chamber, the vented air will move the valve sleeve 19 to its closed position and the locking sleeve 54 to its closed position.

In view of the foregoing, it is believed apparent that applicants have provided a new and improved coupling and valve mechanism which has been described in great detail hereinabove. It should be apparent, however, that certain modifications, changes, and adaptations may be made therein by those skilled in the art to which it relates, and it is hereby intended to cover all such modifications, changes, and adaptations, which come within the scope of the appended claims.

Having described our invention, we claim:

1. A coupling and valve mechanism comprising an axially extending body member having an inlet chamber and an outlet chamber and valve means including a valve sleeve member movable on said body member between open and closed positions to provide for and block fluid flow between said chambers respectively, coupling means on said body member for coupling a conduit to said body member in communication with said outlet chamber, said coupling means including a locking member movable in an axial direction relative to said body member between locking and release positions for preventing and permitting the uncoupling of said conduit from said body member, said valve sleeve member being operable to vent said outlet chamber when said valve sleeve member is moved to its closed position, and means including spaced annular portions of said valve sleeve member and said valve body member for directing vented fluid from said outlet chamber along said body member toward said locking member to urge said locking member in said axial direction to its locking position.

2. A coupling and valve mechanism comprising a body member having an inlet chamber and an outlet chamber and valve means including a valve member movable on said body member between open and closed positions to provide for and block fluid flow between said chambers respectively, coupling means on said body member for coupling a conduit to said body member in communication with said outlet chamber, said coupling means including a locking member movable between locking and release positions for preventing and permitting the uncoupling of said conduit from said body member, said valve means being operable to vent said outlet chamber when said valve member is moved to its valve closed position, and means defining with said valve member a venting chamber defined by walls on all sides and into which said outlet chamber is vented and having a wall on one side thereof forming a portion of said locking member and against which the vented fluid acts to urge the locking member to its locking position.

3. A coupling and valve mechanism comprising a valve body having an inlet chamber and an outlet chamber and a partition separating said chambers, said body having first and second ports opening respectively into the outer periphery of said body and communicating respectively with said inlet chamber and said outlet chamber, a valve sleeve on said body movable forwardly to a position interconnecting said ports and rearwardly to a position blocking communication between said ports and providing for venting of said outlet outlet chamber, said sleeve having an annular portion extending forward along said body over said second port when said sleeve is in its closed position and defining an annular chamber about said body which receives vented fluid from said outlet chamber, a coupling mechanism on said valve body forwardly of said valve sleeve for connecting an outlet conduit to said valve body including a locking sleeve slidable on said body forwardly to a locking position and rearwardly to a released position, opposite sides of said annular chamber being defined by a surface of said locking sleeve and a surface of said valve sleeve, said locking sleeve having a portion disposed in abutting relationship with said annular portion when said sleeves are in locking and open positions respectively, whereby movement of said locking sleeve toward its release position causes movement of said valve sleeve toward its closed position and vented fluid in said chamber tends to urge said sleeves apart.

4. A coupling and valve mechanism as defined in claim 3 wherein said locking sleeve is counterbored providing an annular flange portion which encircles said annular portion of said valve sleeve when said locking sleeve and valve sleeve are in their locking and open positions respectively.

5. A coupling and valve mechanism as defined in claim 4 wherein said locking sleeve is biased to its closed position by a coil spring encircling said body and located between said body and said annular portion of said valve sleeve.

6. A coupling and valve mechanism as defined in claim 3 wherein said chamber is associated with means providing for communication of the chamber with the atmosphere.

7. A valve mechanism comprising a body member having an inlet chamber and an outlet chamber and valve means including a valve sleeve member movable on said body member between open and closed positions to provide for and block fluid flow between said chambers respectively, coupling means on said body member for connecting a conduit to said body member in communication with said outlet chamber, said valve sleeve member being operable to vent said outlet chamber when said valve member is moved to its valve closed position, and means defining with said valve sleeve member a venting chamber having generally annular walls and into which said outlet chamber is vented to provide a pressure fluid force against one of said generally annular walls for urging said valve sleeve member to its closed position.

8. A coupling and valve mechanism comprising a body member having an inlet chamber and an outlet chamber and valve means including a valve sleeve member movable on said body member between open and closed positions to provide for and block fluid flow between said chambers respectively, coupling means on said body member for connecting a conduit to said body member in communication with said outlet chamber, said coupling means including a locking member movable between locking and release positions for preventing and permitting the uncoupling of said conduit from said body member, said valve member being operable to vent said outlet chamber when said valve member is moved to its valve closed position, and means including an annular surface portion of said valve sleeve member and an annular surface portion of said locking member at least partially defining a venting chamber into which said outlet chamber is vented for providing a pressure fluid force urging said valve sleeve to its closed position.

9. A coupling and valve mechanism comprising a valve body having forward and rearward ends an an inlet chamber adjacent the rearward end and an outlet chamber forwardly of the rearward end, a valve sleeve member on said body movable forwardly from a first position blocking flow between said chambers and venting said outlet chamber to a position placing said chambers in communication, a coupling mechanism on said body adjacent said outlet chamber including a locking sleeve member separate from said valve sleeve member and having a forward position for locking an outlet element to said body and a rearward position releasing said element for separation from said body, said sleeve members having cooperating portions forming an annular chamber adjacent said valve body, said body having a port communicating with said outlet chamber and blocked from said annular chamber when said valve sleeve is in its open position and placed in communication with said annular chamber as said valve sleeve is moved rearwardly to its closed position, said sleeves having abutting portions when said sleeves are in their locking and valve open positions respectively, whereby said valve sleeve is moved toward its valve closed position upon movement of the locking sleeve to its release position, said coupling including means for holding said locking sleeve in its release position on the removal of the coupled element and actuated in response to the mating of said element with said body to free the locking sleeve for movement to its locking position.

10. A coupling and valve mechanism for connecting a supply conduit with an outlet conduit comprising a body adapted to be connected with the supply conduit and including a valve body portion and a socket body portion, a plug member adapted to be connected with the outlet conduit and to be received in said socket body portion, said valve body having an inlet chamber and an outlet chamber, a valve sleeve movable in a first linear direction on said valve body between a closed position blocking communication between said inlet and outlet chambers and an open position providing for fluid flow between said inlet and outlet chambers, means providing for locking said plug member in said socket body portion including detent means for locking said plug member and socket body portion together and a locking sleeve separate from said valve sleeve and movable in said first linear direction from a release position to a locking position to actuate said detent means, said valve sleeve and said locking sleeve having abutting portions when said locking sleeve and valve sleeve are in their released and closed positions respectively, and means for blocking movement of said locking sleeve from said release position and for blocking movement of said valve sleeve from said closed position until said plug member is inserted into said socket body portion by movement of said plug member into said socket body portion in a direction of relative linear movement therebetween opposite said first direction, said means for blocking movement of said locking sleeve from said release position and for blocking movement of said valve sleeve from said closed position being operated by insertion of said plug member into said socket body portion to enable said locking sleeve to be moved from said release position and to enable said valve sleeve to be moved from said closed position.

11. A coupling and valve mechanism for connecting a supply conduit with an outlet conduit comprising a body member adapted to be connected to said supply conduit and including a valve body portion and a socket body portion, a plug member adapted to be connected to said outlet conduit and to be received in said socket body portion, said valve body portion defining an inlet chamber and an outlet chamber communicating with said plug member when said plug member is received in said socket body portion, a valve sleeve movable on said body member between open and closed positions communicating said inlet and outlet conduits and blocking communication therebetween and venting said outlet chamber, respectively, a locking sleeve movable on said body member from a release position permitting said plug member to be removed from said socket body portion to a locking position holding said plug member in said socket body portion, said locking sleeve and said valve sleeve having portions which abut when in their locking and open positions respectively, and when in their release and closed positions respectively, said locking sleeve and said valve sleeve having surface portions defining opposed walls of a chamber enclosed on all sides and into which vented fluid is directed from said outlet chamber tending to force said locking sleeve and valve sleeve in opposite directions to their locking and closed positions respectively.

12. A coupling and valve mechanism as defined in claim 11 wherein said locking sleeve is biased to its locking position by a spring means located in said chamber and further including means blocking movement of said locking sleeve to its locking position and releasable by insertion of said plug member into said socket body portion.

13. A coupling and valve mechanism as defined in claim 11 wherein said valve body portion includes a first and second plurality of ports communicating with said inlet and outlet chambers respectively and intersecting the outer periphery of said valve body portion at spaced locations, said valve sleeve having means communicating said ports when in its open position and carrying sealing ring means engageable with the periphery of said valve body portion in said space between said ports when in its closed position.

14. A coupling and valve mechanism as defined in claim 13 wherein said valve sleeve includes a flange portion overlying said second plurality of ports and spaced outwardly of said valve body when said valve sleeve is in its closed position, and the outer end of said flange portion engages in abutting relation the bottom surface of a counterbore in said locking sleeve and which define in part said chamber.

References Cited

UNITED STATES PATENTS

| | | | |
|---|---|---|---|
| 3,106,379 | 10/1963 | Sciuto | 251—149.9 |
| 3,127,149 | 3/1964 | Cruse | 251—149.9 |
| 3,211,178 | 10/1965 | Kiszko | 137—614.04 |

WILLIAM F. O'DEA, *Primary Examiner.*

H. M. COHN, *Assistant Examiner.*